United States Patent Office 2,966,506
Patented Dec. 27, 1960

2,966,506
MODIFIED CLAY COMPLEXES AND METHOD OF PREPARATION

John W. Jordan, Houston, Tex., assignor to National Lead Company, New York, N.Y., a corporation of New Jersey No Drawing. Filed Oct. 28, 1958, Ser. No. 770,001

10 Claims. (Cl. 260—448)

This invention relates to modified clay complexes and to a method of preparing them. More particularly this invention relates to modified clay complexes that are compatible with organic liquids in contrast to an unmodified clay that is dispersible in water.

Organic-clay complexes that are compatible with organic liquids have been known for some time; their preparation and value have been taught for example by Hauser, Patent No. 2,531,427. In accordance with the teachings of this reference a naturally occurring water dispersible clay such as montmorillonite, that normally exhibits a substantial base exchange capacity, can be reacted with an onium compound to produce an organic-clay complex that is compatible with organic liquids. The organic-clay complexes produced in accordance with the above described procedure have been found to have utility in a wide variety of applications where it is desired to impart increased viscosity or gel to an organic liquid.

The organic-clay complexes that have been previously known have in some applications failed to function as gelling agents as efficiently as could be desired. Furthermore organic liquids gelled with previously known organic-clay complexes have not in all instances produced gelled systems with as high a degree of mechanical stability as is desirable.

It is, therefore, an object of this invention to provide an organic-modified clay complex that is useful as a gelling agent in organic liquids.

It is another object of this invention to provide an organic-modified clay complex that has improved gelling efficiency in organic liquids.

It is another object of this invention to provide an organic-modified clay complex capable of gelling organic liquids to produce gelled systems that display a high degree of stability when subjected to mechanical working.

In accordance with the broadest aspects of the present invention an organic-modified clay reaction product is prepared by reacting a clay, which has been subjected to an ion-exchange treatment to convert essentially all of its exchangeable ions to sodium, with one or more organic onium compounds whose cations have sufficient hydrophobic character to impart organophilic character to the modified clay reaction product.

Clays which are useful in the practice of this invention are those that have a substantial base-exchange capacity and whose cations are relatively easy to replace. A particularly desirable type of clay from which organic-modified clay complexes may be prepared is the Wyoming variety of swelling bentonite and the swelling magnesian bentonite (sometimes called Hectorite). These clays exhibit substantial base exchange capacity in the range of 60–100 milliequivalents (me.) of exchangeable bases per 100 grams of clay as found by the ammonium acetate method of determining base exchange capacity. A typical naturally occurring Wyoming bentonite may have approximately 50% of its base exchange capacity satisfied by sodium ions with the remainder of its exchangeable ions being calcium, magnesium and potassium with the major portion being calcium. Because sodium ions commonly constitute a sizeable fraction of the exchangeable metallic ions in a naturally occurring bentonite clay it has been a rather widespread practice to refer to such clays as sodium bentonite even though a substantial portion of the exchangeable ions, perhaps 50% or more, are ions other than sodium. In addition to the clays mentioned above other clays such as attapulgite, nontronite, illite, saponite, zeolite and fuller's earth are useful in the practice of my invention, all being characterized by an unbalanced crystal lattice, and are believed to have negative charges which are normally neutralized in their natural state by inorganic metal ions which to varying degrees are capable of being replaced by other inorganic or organic ions.

The organic compounds useful in the practice of the present invention are "onium" compounds which have substantial hydrophobic properties and which are capable of undergoing a base exchange type reaction with clays prepared in accordance with this invention. An "onium" compound is defined in Hackh's Chemical Dictionary, third edition as:

"A group of organic compounds of the type RXHy, which are isologs of ammonium and contain the element X in its highest positive valence; as where X is pentavalent as in ammonium, phosphonium, arsonium and stibonium; where X is tetravalent as in oxonium, sulfonium, selenonium and stannonium compounds and where X is trivalent as in iodonium compounds; and that they may be considered addition compounds of oxonium, carbonium, stibonium, c.f. -inium, -ylium."

Organic ammonium salts are among the preferred types of onium compounds which can readily undergo a base exchange reaction with clays; this class of compounds includes by way of example and not by way of limitation the salts of primary, secondary and tertiary amines, including mono- and poly-amines as well as aliphatic, aromatic, cyclic and heterocyclic amines; a particularly useful class of onium compounds for preparing organic-modified clay complexes is the quaternary ammonium salts. Other monovalent or polyvalent onium compounds which are useful in the practice of this invention include triphenylalkyl phosphonium, arsonium and stibonium-halides, dialkyl or aryl sulphonium and selenonium halides as well as pyrones, such as 2,5-dialkyl gamma pyrone hydrochloride.

The oganic onium salts used in the practice of this invention should possess substantial hydrophobic character and be reacted with the clay in sufficient quantity to impart definite organophilic properties to the resulting organic-modified clay complex. It will, in some instances, be found advantageous to prepare an organic-modified clay complex by reacting the ion exchange treated clay with two or more onium compounds in such a manner that part of the exchangeable ions of the clay are replaced by the cations of one onium compound and the remaining exchangeable ions of the clay are replaced by the cations of one or more additional onium compounds.

Specific examples of typical ammonium compounds which have been found useful in the practice of this invention include octadecyl ammonium chloride, hexadecyl ammonium acetate, dimethyldioctadecyl ammonium bromide, dodecyl ammonium chloride, dimethyloctadecylbenzyl ammonium chloride, N,N-dioctadecylmorpholinium chloride and 1-(2-hydroxyethyl)-2-dodecyl-1 benzyl-2 imidazolinium chloride. Any of the foregoing compounds can be used either by themselves or in combination to react with an ion exchange treated clay to produce an organic-modified clay complex.

As previously indicated the preferred organic compounds useful in the practice of this invention are organic onium salts; however this invention is not to be restricted to the reaction of an onium salt with ion-exchanged clay but includes the composition formed by a free organic base and an ion-exchanged clay wherein the free organic base is capable of reacting with water to give an onium hydroxide which in turn combines with the ion-exchanged clay to produce an organic-modified clay composition, e.g.

R—NH$_2$+Na$^+$bentonite$^-$+H$^+$OH$^-$
⇌RNH$_3^+$bentonite$^-$+Na$^+$+OH$^-$ wherein R is an organic radical containing at least 10 carbon atoms.

The preparation of an organic-modified clay complex such as is contemplated by this invention is accomplished by first dispersing a naturally occurring clay in water to produce a dilute slurry. This dilute clay slurry is then subjected to an ion-exchange treatment which causes a replacement of calcium, magnesium, etc., ions on the surface of the clay particles with sodium ions. Many of the highly swelling bentonitic clays exist in their natural state with a large portion of their base exchange capacity satisfied with calcium and magnesium ions; these metallic ions are apparently comparatively difficult for organic cations to replace.

Now in accordance with the present invention it has been found that a much improved organic-modified clay complex can be prepared by subjecting the clay to an ion-exchange treatment to convert it more or less completely to the sodium form prior to reacting it with an onium compound of the type described.

In commercial practice one of the most satisfactory methods that has been found for producing a homoionic clay in which essentially all of the exchangeable ions are sodium is by passing a dilute clay slurry through an ion-exchange column using a fixed bed technique. However, other methods of using an ion-exchange material such as the batch technique or a continuous column operation may be equally well suited to some specific production situations. Regardless of which of these methods is used it is necessary to provide for systematic regeneration of the exchanger bed. In the case of sodium exchangers this is customarily accomplished by flushing the bed with a concentrated solution of sodium chloride. For a further discussion of ion exchange techniques reference is made to a comprehensive article entitled "Ion Exchange" by N. K. Hiester and R. C. Phillips, page 161, October 1954 issue of Chemical Engineering.

A wide variety of cation exchange resins is readily available on the commercial market and a representative number of them have been evaluated in order to determine the most suitable resin for producing a homoionic sodium clay on a commercial scale. In general the high capacity resins such as the sulfonated styrene type cation exchangers have been found to be the most satisfactory. This type of high capacity resin is available from several suppliers under various tradenames such as Amberlite IR-120, Rohm and Haas, and Nalcite HCR, National Aluminate Corporation.

An additional method of producing a homoionic clay which can be utilized in the practice of this invention is by repeatedly leaching a finely ground naturally occurring clay with a solution of a water soluble sodium compound such as sodium chloride and subsequently washing the converted clay free of excess salt.

The organic-clay complexes contemplated by this invention can be conveniently produced by reacting a dilute aqueous dispersion of one or more organic onium salts with a dilute slurry of clay that has been converted to the sodium form in accordance with one of the methods previously discussed. It may frequently be desirable to separate the non-clay contaminants from the clay slurry either before or after converting it to a homoionic sodium clay. This separation can be readily accomplished by permitting the contaminants to settle out of a dilute aqueous dispersion of the clay or they can be removed by super-centrifuging. As indicated the onium salts can be conveniently introduced to the clay slurry in the form of a dilute aqueous dispersion although in the case of some reactants satisfactory results may be obtained by introducing the onium salts in a concentrated form directly into the clay slurry. The flocculated organic-modified clay complex that is formed is readily separated from the aqueous phase by filtration after which it can be washed, dried and ground to produce a fine pulverulent product. This finely ground product can be readily incorporated in a wide variety of organic fluids to impart to them increased viscosity and gel structure. The organic-modified clay complexes can frequently be more readily incorporated into an organic fluid by heating the mixture and/or by subjecting it to vigorous shearing action such as produced in a multiple-roll paint mill or homogenizer.

Where the presence of a small amount of reaction impurities in the gelled system is of no particular consequence it may be advantageous to form the organic-modified clay reaction product in the organic fluid that is to be gelled. This can be done by introducing to the aqueous ion-exchanged clay slurry a predetermined amount of oil or other organic fluid which contains a sufficient quantity of one or more onium compounds to react with the clay and produce an organophilic clay complex. After thorough mixing the major portion of the aqueous phase can be readily separated from the bodied organic phase by decanting, filtering, etc., and the remaining water removed from the gelled organic system by heating.

The nature of the present invention and its value will be illustrated by the following specific examples which represent typical embodiments thereof but are not, however, to be considered as limitations.

*Example I*

An aqueous slurry of Wyoming bentonite clay was prepared containing approximately 4½ percent clay solids by weight. This clay had a base exchange capacity of 82 me./100 grams as determined by the ammonium acetate method; sodium ions comprised approximately 63% of the exchangeable bases, the remaining exchangeable bases consisting primarily of calcium with a small percentage of magnesium. The non-clay contaminants were removed from this slurry by subjecting it to super-centrifugation in a continuous process Merco centrifuge. The base exchange capacity of the clay was determined by the ammonium acetate method after the removal of the non-clay contaminants and found to be 98 me./100 grams, sodium ions comprising approximately 70% of the exchangeable bases, the remaining exchangeable bases being primarily calcium and magnesium. After centrifugation the slurry which contained 2½% clay solids was passed through a 2 cubic foot fixed bed ion-exchange column containing a commercial sodium exchange resin known as Amberlite IR-120. The clay slurry was fed through the ion-exchange column at the rate of 2 gallons per minute. The base exchange capacity of the clay was again determined by the ammonium acetate method and found to be 98 me./100 grams with sodium ions comprising 95% of the exchangeable bases, the remaining exchangeable ions being calcium and magnesium. Twenty gallons of this centrifuged, ion-exchange treated slurry containing 4.29 lbs. of clay was thoroughly mixed with a dilute aqueous dispersion containing 3.29 lbs. of dimethyldioctadecyl ammonium chloride available commercially under the tradename Arquad 2HT. The dimethyldioctadecyl ammonium chloride had a mole combining weight of 600 and was 75% active quaternary ammonium chloride. The amount of quaternary salt used was calculated to produce an organic-modified clay complex having 98 me. of amine per 100 grams of clay and thus theoretically completely satisfy the base exchange capacity of the clay as determined by the ammonium acetate method. The well flocculated organic-modified clay complex formed by the reaction of the clay and quaternary salt was filtered, washed, dried, and ground to produce a finely powdered product.

*Example II*

The procedure described in Example I was repeated using new portions of the same reactants and in the same proportions with the exception that the clay slurry was passed through the ion-exchange column at the rate of 5 gallons per minute after which it was reacted with the quaternary ammonium salt dispersion. The base exchange capacity of the clay prior to reaction was 98 me./100 grams with sodium ions comprising 86% of the exchangeable bases, the remaining exchangeable bases being primarily calcium and magnesium.

*Example III*

The procedure described in Example I was repeated using new portions of the same reactants and in the same proportions with the exception that the centrifuged clay slurry was given two passes through the ion-exchange column at the rate of 2 gallons per minute prior to reacting it with the quaternary ammonium salt dispersion. The base exchange capacity of the clay prior to reaction was 98 me./100 grams with sodium ions comprising 100% of the exchangeable bases.

*Example IV*

The procedure described in Example I was again carried out using new portions of the same reactants and in the same proportions with the exception that the clay slurry was not subjected to an ion-exchange treatment but was reacted with the quaternary ammonium salt dispersion immediately after being centrifuged. The resulting organic-clay complex was, as in the case of Example I, filtered, washed, dried, and ground to produce a finely powdered product.

*Example V*

An organic-clay complex containing a mixture of two quaternary ammonium salts was prepared by reacting a 20 gallon portion of the centrifuged, ion-exchange treated clay slurry prepared in Example I with a dilute aqueous dispersion containing 2.96 lbs. of dimethyldioctadecyl ammonium chloride and 0.21 lb. of dimethyloctadecylbenzyl ammonium chloride, available commercially under the tradename Arquad DMHT–B. The mole combining weight of the dimethyloctadecylbenzyl ammonium chloride was 460 and it contained 90% active quaternary ammonium chloride. The resulting reaction product flocculated readily and was easily filtered, washed, dried, and ground to produce a finely powdered product.

*Example VI*

A second sample was prepared from a mixture of quaternary ammonium salts in accordance with the procedure described in Example V using new portions of the same reactants and in the same proportions with the exception that the clay slurry was not subjected to an ion-exchange treatment, but was reacted with the quaternary salt dispersion immediately after being centrifuged. The flocculated reaction product was processed as in the previous examples to produce a finely powdered material.

*Example VII*

In order to evaluate the gelling efficiency of products produced in accordance with this invention grease samples were made from each of the organic-modified clay complexes prepared in Examples I through VI. The following procedure was observed in preparing all grease samples: Sixty grams of the organic-modified clay complex was thoroughly stirred for 5 minutes with 910 grams of a solvent refined neutral paraffin oil; to this stirred mixture was added 30 grams of acetone which functioned as a polar dispersant for the organic-modified clay complex. The mixture was then stirred for an additional 25 minutes after which it was pumped through a laboratory model No. 2 Tri-Homo Disperser set at a rotor to stator clearance of 1/1000 of an inch. The grease samples were pumped through the disperser at the rate of 0.4 lb./min. The resulting grease containing 6% of the gelling agent was permitted to stand overnight and was then evaluated in accordance with the ASTM Cone Penetration Test Procedure D 217–52T. The data obtained is summarized in the following table:

| Sample | Organic-modified clay complex prepared in accordance with Example— | Percent of clay's base exchange capacity satisfied by Sodium | Onium salt reacted with clay | Grease Penetration, mm.×10 ASTM Worker | | |
|---|---|---|---|---|---|---|
| | | | | 60 strokes | 1,000 strokes | 10,000 strokes |
| 1 | IV | 70 | dimethyldioctadecyl ammonium chloride | 311 | 318 | 361 |
| 2 | II | 86 | -----do----- | 314 | 320 | 369 |
| 3 | I | 95 | -----do----- | 272 | 272 | 285 |
| 4 | III | 100 | -----do----- | 250 | 252 | 252 |
| 5 | VI | 70 | dimethyldioctadecyl ammonium chloride (90 mole percent)+dimethyloctadecylbenzyl ammonium chloride (10 mole percent). | 295 | 295 | 305 |
| 6 | V | 95 | -----do----- | 276 | 274 | 277 |

After considering the preceding examples it will be apparent that organic-modified clay complexes prepared in accordance with this invention in which the clay is converted to essentially a homoionic sodium clay prior to reaction with an onium compound are superior gelling agents when compared to previously known organic-clay reaction products. The improvement in initial gelling efficiency can be seen by comparing the 60 stroke penetration values shown in Example VII which indicate that an increasingly stiffer grease is obtained (as shown by lower penetration values) as the percentage of exchangeable sodium ions in the clay is increased. The improved mechanical stability of greases thickened with organic-modified clay complexes prepared in accordance with this invention can be seen by comparing the change in penetration values in going from 60 to 10,000 strokes as shown in Example VII. These data indicate that the mechanical stability of a grease is markedly improved when the base exchange capacity of the clay is due primarily to a high percentage of exchangeable sodium ions. The trend in increased gelling efficiency and improved mechanical stability are particularly apparent when exchangeable sodium ions account for 90–95% or more of the clay's base exchange capacity.

Having thus described the invention, what is claimed is:

1. A composition of matter consisting of the reaction product of a bentonitic clay and an organic ammonium salt, said bentonitic clay having been subjected to an ion-exchange treatment to convert essentially all of its exchangeable ions to sodium prior to reaction with a sufficient quantity of said organic ammonium salt to impart organophilic character to the reaction product, the cation of said organic ammonium salt containing at least 10 carbon atoms.

2. A composition of matter consisting of the reaction product of a bentonitic clay and an organic ammonium salt, said clay having been subjected to an ion-exchange treatment to convert at least 90% of its exchangeable ions to sodium prior to reaction with a sufficient quantity of said organic ammonium salt to impart organophilic character to the reaction product, the cation of said organic ammonium salt containing at least 10 carbon atoms.

3. An organic-modified clay reaction product wherein a clay, originally exhibiting a base exchange capacity of at least 60, has been subjected to an ion-exchange treatment to convert essentially all of its exchangeable ions to sodium prior to reaction with a sufficient quantity of said organic ammonium salt to impart organophilic character to the reaction product, the cation of said organic ammonium salt containing at least 10 carbon atoms.

4. A composition of matter consisting of the reaction product of a bentonitic clay and organic ammonium salts, said clay having been subjected to an ion-exchange treatment to convert essentially all of its exchangeable ions to sodium prior to reaction with a sufficient quantity of said organic ammonium salts to impart organophilic character to the reaction product, the cation of at least one of said organic ammonium salts containing more than 9 carbon atoms.

5. A composition of matter consisting of the reaction product of a bentonitic clay and an organic ammonium salt, said clay having been subjected to an ion-exchange treatment to convert essentially all of its exchangeable ions to sodium prior to reaction with a sufficient quantity of said organic ammonium salt to at least completely satisfy the base exchange capacity of said ion exchange treated clay, the cation of said organic ammonium salt containing at least 10 carbon atoms.

6. A composition of matter consisting of the reaction product of a bentonitic clay and an organic ammonium salt, said clay having been subjected to an ion-exchange treatment to convert essentially all of its exchangeable ions to sodium prior to reaction with said organic ammonium salt to an extent sufficient to impart organophilic character to the reaction product, the cation of said organic ammonium salt containing at least 10 carbon atoms.

7. A process of producing an organic-modified clay reaction product from a bentonitic clay and an organic ammonium salt, wherein said clay is subjected to an ion-exchange treatment to convert essentially all of its exchangeable ions to sodium prior to reaction with a sufficient quantity of said organic ammonium salt to impart organophilic character to the reaction product, the cation of said organic ammonium salt containing at least 10 carbon atoms.

8. A process of producing an organic-modified clay reaction product from a bentonitic clay and an organic ammonium salt, wherein said clay is subjected to an ion-exchange treatment to convert essentially all of its exchangeable ions to sodium prior to reaction with a sufficient quantity of said organic ammonium salt to impart organophilic character to the reaction product, the cation of said organic ammonium salt containing at least 10 carbon atoms.

9. An organic-modified clay reaction product in accordance with claim 1 wherein the organic ammonium salt is dimethyldioctadecyl ammonium chloride.

10. An organic-modified clay reaction product in accordance with claim 4 wherein the organic ammonium salts are dimethyldioctadecyl ammonium chloride and dimethyloctadecylbenzyl ammonium chloride.

References Cited in the file of this patent

UNITED STATES PATENTS

| | | |
|---|---|---|
| 2,143,670 | Young | Jan. 10, 1939 |
| 2,531,440 | Jordan | Nov. 28, 1950 |
| 2,704,702 | Pike | Mar. 22, 1955 |